Jan. 11, 1949. G. H. PRIDE 2,459,045
LOADING AND UNLOADING APPARATUS FOR VEHICLES
Filed April 25, 1947 3 Sheets-Sheet 2
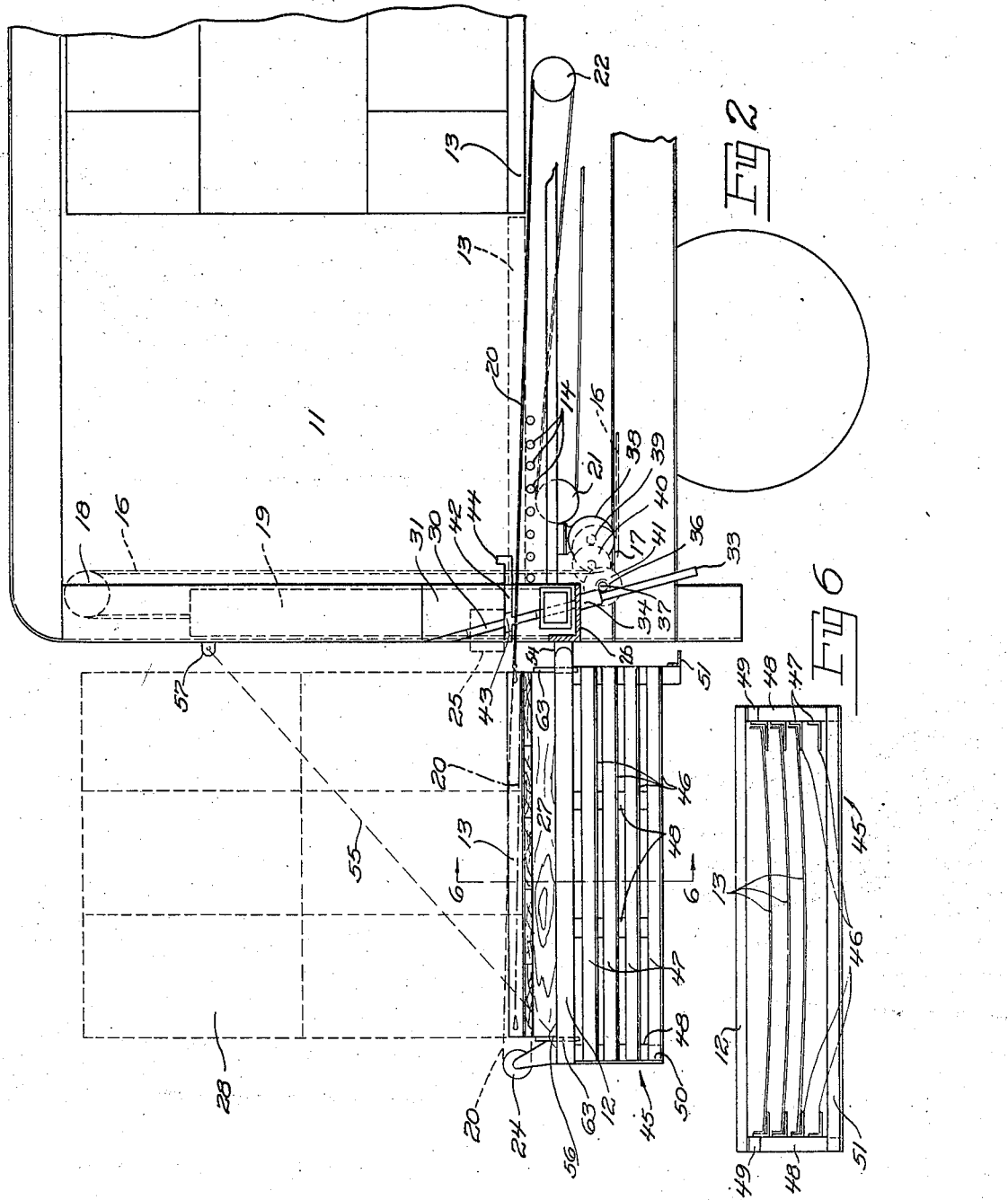
INVENTOR.
GEORGE H. PRIDE
BY
Fraser, Myers & Manley
attorneys Jan. 11, 1949.  G. H. PRIDE  2,459,045
LOADING AND UNLOADING APPARATUS FOR VEHICLES
Filed April 25, 1947  3 Sheets-Sheet 3
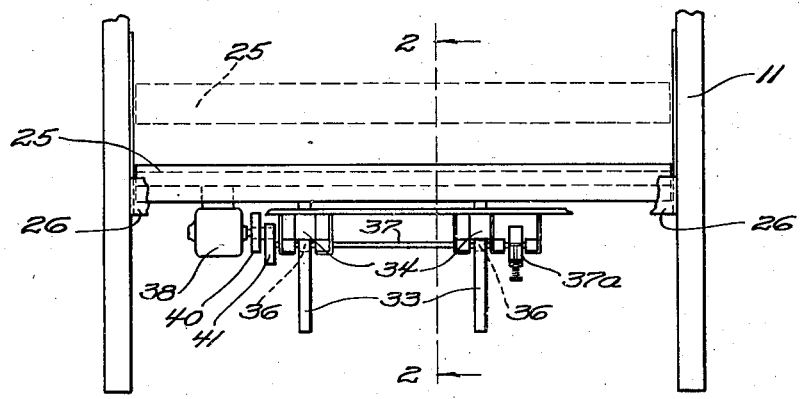
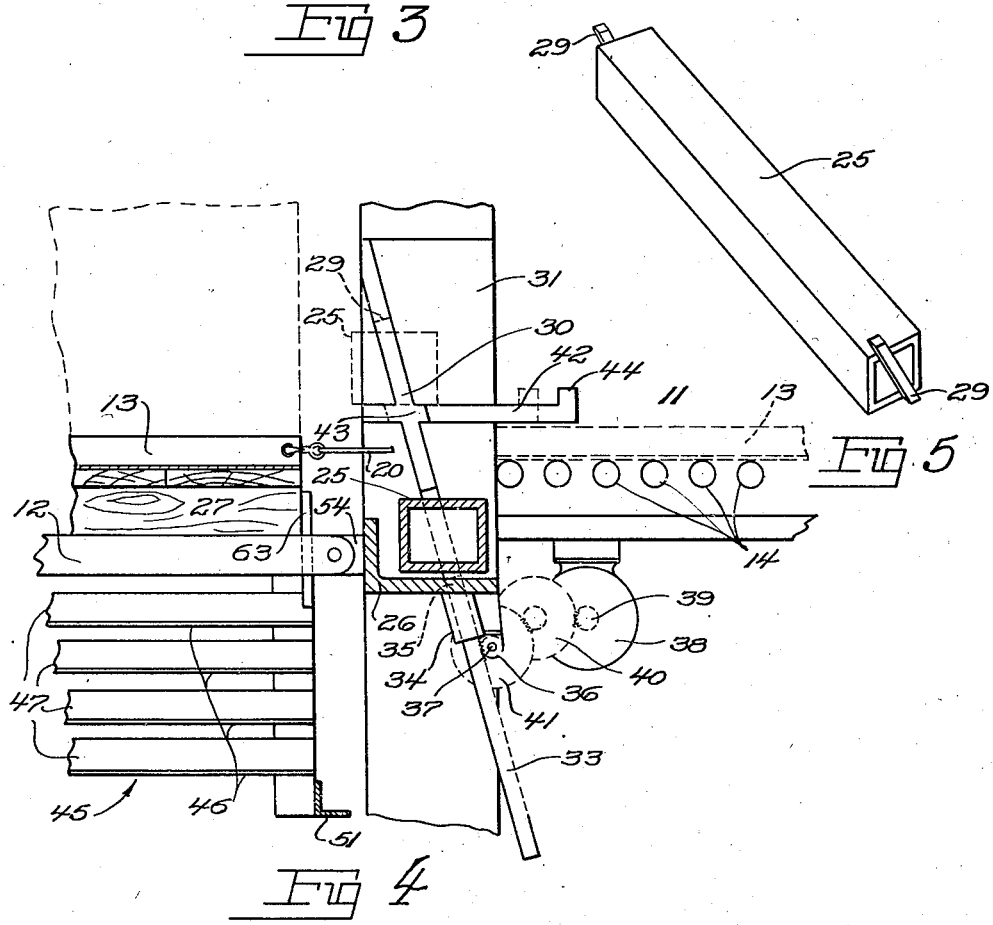
INVENTOR.
GEORGE H. PRIDE
BY
Fraser, Myers & Manley
attorneys Patented Jan. 11, 1949

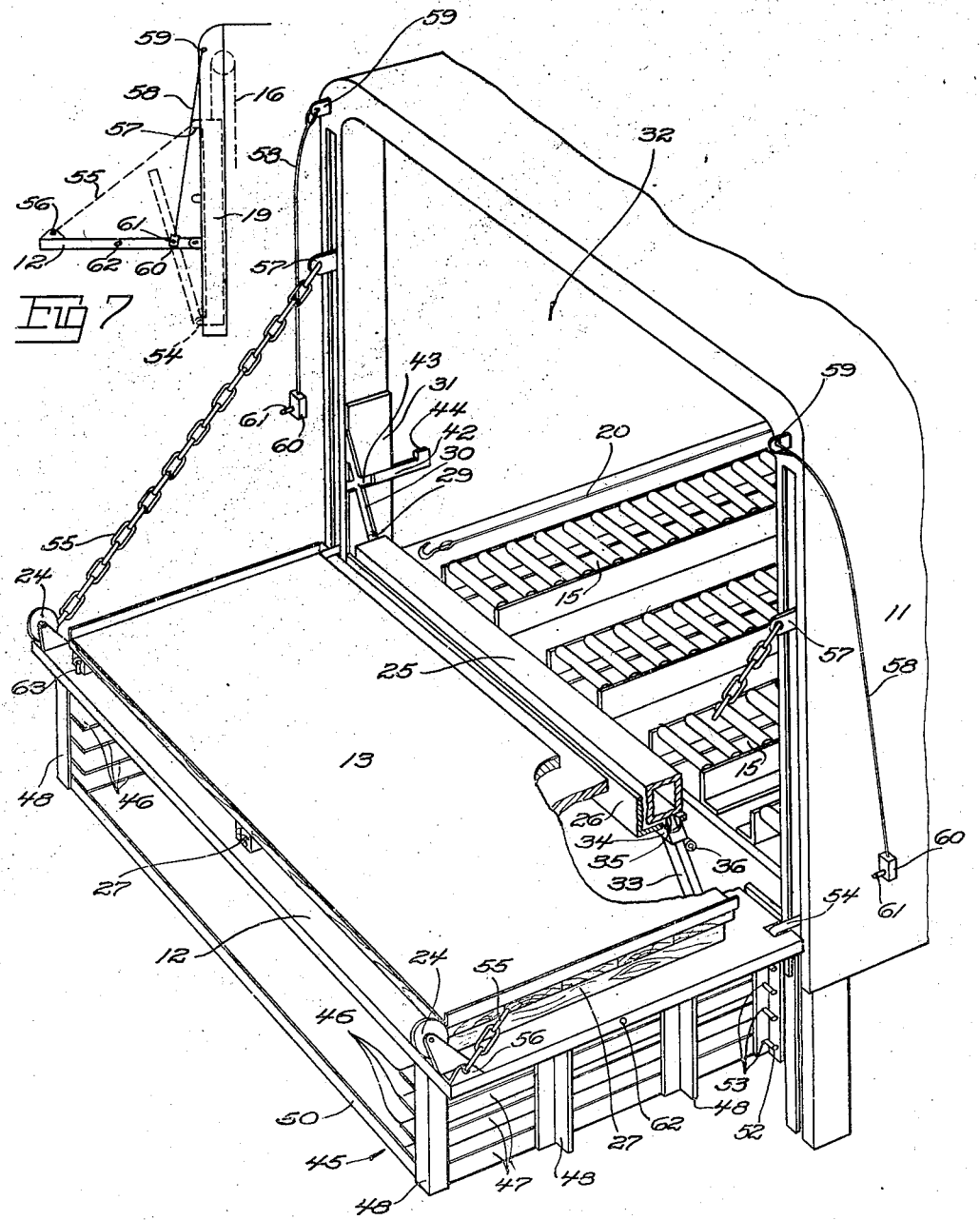

2,459,045

UNITED STATES PATENT OFFICE 2,459,045

LOADING AND UNLOADING APPARATUS FOR VEHICLES

George H. Pride, New York, N. Y.

Application April 25, 1947, Serial No. 743,937

9 Claims. (Cl. 214—65)

This invention relates to improvements in loading and unloading apparatus for vehicles and more particularly relates to means for stripping a pallet upon which a load unit has rested during transit, from beneath that load unit so that the latter, without the pallet, may be delivered from the vehicle to a receiver.

The present invention is in the nature of an improvement upon the apparatus described in my co-pending application, Serial No. 547,216, filed July 29, 1944, now Patent No. 2,421,128, granted May 27, 1947. The said co-pending application disclosed a mechanism for use in loading and unloading vehicles and more particularly road vehicles such as automobile trucks or trailers. That mechanism included a plurality of separate, relatively thin floor plates or pallets which served as floor plates, each of a suitable size for carrying a stacked load unit of goods as, for example, a stack of material packed in cartons or a stack of sheet metal or paper, or a stack of goods such as sugar or flour put up in bags. The separate floor plates or pallets were independently movable horizontally into or out of the body of the vehicle with a load unit thereon; and the truck structure also included a cable mechanism which, in one arrangement, could be employed to pull a floor plate or pallet and its load into the body of the truck, and in another arrangement, could be employed to pull such a floor plate or pallet and its load from within the truck to a supporting surface at the exterior thereof.

In a loading operation, each floor plate, according to the disclosure of said application, would be disposed in turn upon the tail gate of the vehicle and then receive thereon a stack of goods constituting a load unit. Then, after assuring that the tail gate was at a proper height, the floor plate or pallet and its load unit would be pulled by the mentioned cable mechanism into the body of the vehicle. The several floor plates or pallets would each be loaded and moved separately into the vehicle body in this manner until the truck was fully loaded or until the entire shipment to be moved had been disposed within the truck body.

At the point of destination each floor plate or pallet and its load would be moved separately by the cable mechanism from its position within the vehicle out onto a skid on the tail gate. At this stage of operations the floor plate or pallet would be stripped from beneath its load unit so that the floor plate or pallet could remain with the vehicle and the load could be delivered to the receiver in its stacked form. In order to do this without tipping or in any way deforming or breaking up the load unit, an abutment bar was placed at a level slightly above the floor plate or pallet and between the lower portion of the load unit and the rear faces of the uprights defining the doorway of the vehicle. The abutment bar, as thus positioned served to prevent material forward movement of the load unit, and the skid was suitably restrained against forward movement while the cable arrangement was employed to pull the floor plate or pallet forcibly forwardly from beneath the load unit. As the floor plate or pallet was relatively thin this stripping operation would not materially tip, deform or break up the load unit.

Although the apparatus as described in my said copending application has proven in actual use to be very effective in saving time and expense in the loading and unloading of such vehicles, nevertheless there were certain respects in which it seemed open to improvement. The mentioned abutment bar, according to my said application, could be a stout length of lumber, but in practice it was found that a piece of lumber stout enough for the purpose was quite large and heavy and that it was better to provide an abutment bar of metal of suitable design to enable it to withstand the very substantial bending stresses applied thereto in such an arrangement. In any event, the abutment bar was necessarily quite cumbersome and had to be placed in position and later removed therefrom manually and also constituted a separate element to be carried at all times with the vehicle.

Also, in my said co-pending application no special provisions were shown for accommodating one or several empty floor plates or pallets while another floor plate or pallet with a load thereon was being moved into or out of the vehicle body by the cable arrangement.

An important object of this invention is the provision of improved means for stripping a floor plate or pallet from beneath a load unit thereon without materially tipping, deforming or breaking up said load unit.

Another object of the present invention is the provision of an abutment bar and means in a vehicle for carrying said abutment bar in an inactive position in which it does not interfere in any way with the horizontal movement of a floor plate or pallet and a load unit thereon either into or out of the vehicle body.

Another object of this invention is the provision of mechanical means for moving said abutment bar from its mentioned inactive position into an active position where it may serve the purpose of an abutment bar in the manner already described, and for moving said bar back to its inactive position.

Another object is the provision of means for locking the abutment bar in its active position.

Another object of this invention is the provision of means for stowing empty floor plates or pallets while another floor plate or pallet with a load thereon is being moved horizontally into or out of the vehicle.

Another object of this invention is the provision of an elevatable tail gate for a vehicle, with improved means for angularly moving the tail gate from a horizontal or open position to a substantially vertical or closed position.

The foregoing and other objects and advantages of this invention should be apparent from the following description and the accompanying drawings of a preferred embodiment of this invention.

In the drawings:

Figure 1 is a perspective view of the rear end of a vehicle embodying a preferred form of the present invention, portions being broken away to make visible my improved abutment bar and portions of means for operating the latter.

Fig. 2 is a longitudinal sectional view of the rear end of such a vehicle substantially on the line 2—2 of Fig. 3.

Fig. 3 is a rear elevational view of the lower portion of the body of such a vehicle, the tailgate being omitted to show other parts more clearly.

Fig. 4 is an enlargement of a portion of the structure shown in Fig. 2.

Fig. 5 is a perspective view of an illustrative form of abutment bar, this bar being of the form shown in the other figures.

Fig. 6 is a fragmentary cross-sectional view of the tailgate, substantially on the line 6—6 of Fig. 2, showing pallet stowing racks on the under side of the tailgate and several empty pallets therein.

Fig. 7 is a diagram illustrating the means for closing and opening the tailgate.

Except for improvements hereinafter described, a vehicle embodying the present invention may be substantially as disclosed in my said co-pending application. Thus it may comprise a body 11 (the rear only of which is shown in the present drawings), an elevatable tailgate 12, a plurality of floor plates or pallets 13 supported in abutting end to end relationship in a longitudinal series within the body 11 upon a plurality of rollers 14 which either may be carried directly within the bottom structure of the body 11 or may constitute parts of conveyers 15 disposed longitudinally of the truck and supported therein by the mentioned bottom portion of the truck body. Power actuated cables 16 at opposite sides of the truck body (only one being shown in the drawings) working about sheaves 17 and 18 are connected to a vertically slidable shoe 19 for raising and lowering the latter and the tailgate 12 carried thereby; and power actuated cables 20 at each side of the truck body (only one being shown in the drawings) adjustable about sheaves 21, 22 and 24, are provided for connection at their ends to the pallets 13 for moving the latter with loads thereon horizontally into the body of the vehicle from the tailgate or vice versa.

The present invention involves improvements relating to a mechanically actuated abutment bar, convenient stowing means for the temporary disposal of empty pallets 13 while loaded pallets are being moved into or out of the vehicle, and improved operating means for opening and closing the tailgate. As should be clear from the hereinafter described operations, these features all work together to effect substantial savings of labor, time and expense in loading and unloading a vehicle.

Referring first to the mentioned mechanically actuated abutment bar, such a bar, identified as 25, is preferably an elongated bar of strong metal such as steel capable of withstanding severe bending stresses, and extends substantially completely across the inner width of the vehicle body 11, as best understood from Figs. 1 and 3. The abutment bar 25, illustrated in the accompanying drawings, is shown as being substantially square in cross-section and hollow.

The abutment bar 25 may rest, in an inactive position, within the angle of a transverse angle bar 26 which constitutes a fixed or integral portion of the bottom of the body 11. As best seen in Figs. 2 and 4, the abutment bar, when in such inactive position as shown in full lines in said figures, has its uppermost surface somewhat lower than the upper surfaces of the rollers 14, so that a pallet 13, with a load thereon, may freely move horizontally between a position on said rollers within the truck body and a position on a skid 27 on the tailgate 12 without any interference from the said abutment bar.

The abutment bar 25 is slidable upwardly and downwardly along an angular path between its said inactive position and an active position indicated in broken lines in Figs. 2, 3, and 4, the said bar, for this purpose being provided at its opposite ends with shoes 29, welded or otherwise fixed thereupon in similar angular positions, and arranged to slide in and be guided in guideways 30 formed, at the angle of the intended path of abutment bar movement, in reinforcing plates 31 provided at opposite inner sides of a doorway 32 of the vehicle body.

Mechanical means for moving the abutment bar 25 up and down in said guideways comprise a pair of racks 33, slidably guided within guide-sleeves 34 welded or otherwise suitably fixed to the under side of the angle bar 26, the said racks extending through said guide-sleeves and suitable openings 35 in the bar 26 substantially in parallelism with the guideways 30. The racks 33 have their upper ends abutting but not connected to the underside of the abutment bar 25.

The racks 33 may be moved up and down by pinions 36 driven by any suitable motive means. As illustrated herein the pinions 36 are keyed upon a cross-shaft 37 which is driven by a reversible electric motor 38 through a pinion 39 keyed on the shaft of said motor and reduction gears 40, 41 as may best be understood from Fig. 4. A suitable brake 37a (Fig. 3), is arranged to apply a continuous braking effect upon the cross-shaft 37 to enable the racks 33 to hold up the abutment bar 25, even when the motor 38 is stopped. The mentioned rack-driving mechanism, of course, is suitably carried by the body 11 of the vehicle.

As the space below the abutment bar must be clear when the latter is in its raised or active position in order to permit a pallet 13 to be pulled forwardly through said space to strip it from beneath a load unit resting upon a skid 27 on the tailgate, I provide means for supporting the abutment bar in its active position, independently of the racks 33 so that the latter may be lowered to provide such a clear space.

The mentioned abutment bar supporting means comprises a manually slidable latch 42 within a horizontally extending retaining and guiding guideway 43 formed in the plate 31 and intersecting the guideway 30. For convenience of manipulation the latch 42 may have an upward extension 44 at its forward end. The latch 42 is shown in its non-supporting position in full lines in Fig. 4 and, when the abutment bar 25 is in or slightly above its active position as shown in said figure in broken lines, the latch 42 may be slid rearwardly, manually to its supporting position as shown in broken lines in said figure. In the latter position it is disposed underneath and directly in the path of the shoe 29 so that when the racks 33 are lowered, the latch 42 coacts with the shoe 29 to hold the abutment bar 25 up in its active position. Similar latch arrangements, as described, preferably are provided at each side of the vehicle for supporting the abutment bar at both its ends.

As best shown in Figs. 1, 2, 4 and 6, means for stowing empty pallets 13 comprise a stowing rack 45 fixed to the outer or under side of the tailgate 12. This stowing rack will now be described as viewed with the tailgate in its active or horizontal attitude as shown in the drawings. The stowing rack 45 may consist of a plurality of ledges which may be in the form of inwardly extending horizontal flanges 46 of metal angle bars 47 supported in spaced superposed longitudinally-extending positions at opposite sides of the underside of the tailgate 12 by hangers 48 suitably fixed at their upper ends to the tailgate as by angle-brackets 49, riveted, bolted, or otherwise suitably secured to the tailgate. Although the hangers 48 strongly oppose spreading apart of opposed angle bars 47 at opposite sides of the tailgate, nevertheless any such spreading tendency may be additionally opposed by a crossbar 50 (or more than one if desired) suitably fixed, at its ends, to the opposed rearmost hangers 48.

In order not to complicate other figures showing the pallet stowing rack 45, pallets are shown associated with said rack only in Fig. 6, from which it may be seen that although the pallets may sag somewhat when in the stowing rack, the flanges 46 are made wide enough to maintain an adequate supporting engagement with opposite sides of the pallets 13 in said rack. It may also be observed from Fig. 1 that the hangers 48 are short angle bars and that the rearmost of these hangers are disposed with one flange thereof extending inwardly to form a stop limiting rearward sliding of the pallets 13 in the stowing rack. The other hangers 48 each have one flange in face to face contact with and fixed to the vertical flanges of the angle bars 47 and the other flanges of said hangers extend outwardly.

Although it is not essential to provide a cross member interconnecting the opposed front ends of the angle bars 47 at opposite sides of the tailgate, such a cross member 51 may be provided, as best seen in Figs. 2, 4 and 6, at a lower level than a pallet resting, with some sag, upon the lowermost flanges 46. To make it possible to carry one or more empty pallets 13 in the rack 45 in transit, as where only a partial vehicle load is being transported, suitable means such as pins 52 extending through holes 53 in the forwardmost hangers 48 may engage the forward ends of empty pallets 13 in the stowing rack to support such pallets when the tailgate is in its closed or vertical position as it normally would be when the vehicle is moving in transit. Such supporting means, however, are not essential for all empty plates may be carried within the vehicle body 11 in transit. From the hereinafter described loading and unloading operations it will be understood that the described stowing rack 45 is rendered useful chiefly by reason of the fact that the tailgate 12 is vertically movable.

As best understood from Figs. 1 and 2, the tailgate 12 is pivoted at its forward end to lugs 54 integral with the lower ends of tailgate shoes 19 and, when the tailgate is open, it is held in horizontal position by chains 55 or their equivalent connected to the rearward end of the tailgate, as at 56, and to lugs 57 integral with the upper ends of the shoes 19. The latter, of course, are suitably restrained against any material angular movement relatively to the vehicle body 11.

The present invention includes novel means for closing and opening the tailgate 12, i. e., for moving it angularly between its horizontal or open position and its vertical or closed position. Such means are illustrated structurally in Figs. 1 and 2, and diagrammatically in Fig. 7, and comprise a pair of cables 58 or their equivalent suitably fixed at their upper ends to the upper rear of the body 11 as at 59 and having fixed to their lower ends blocks 60 with integral horizontally extending pins 61 adapted to be inserted manually in holes 62 (only one being shown in the drawings) in opposite sides of the tailgate 12. The approximate length of the cables 58 and the approximate position of the holes 62 are indicated in the drawing and these characteristics should be such as to yield the following operation of the tailgate.

Assuming that the tailgate 12 is in its horizontal or open position substantially at the level of the bottom of the body 11, in which position it is shown in full lines in Fig. 7, also that the cable 16 is actuated by an electric motor (not shown) and that it is desired to move the tailgate clockwisely to close it; the operator first operates the controls of said electric motor to cause the cable 16 to pull the shoe 19 and the tailgate 12 upwardly while the latter remains in its horizontal attitude. When the tailgate is elevated almost to its highest possible position, the electric motor is shut off and the tailgate is held in that elevated position either by the reduction gearing of said motor or a suitable brake or other hold-up means, none of which appear in the drawings.

When the tailgate 12 is in the mentioned elevated position, the operator inserts the pins 61 of both cables 58 into the holes 62 at opposite sides of the tailgate, then starts the tailgate-elevating electric motor reversely to its former operation to lower the shoes 19. During the latter's descent, the cables 58 become taut and thereafter prevent the tailgate from continuing downwardly in horizontal attitude while the shoes 19, nevertheless, continue to descend. This lowers the pivotal point of the tailgate at the lugs 54 wherefore the tailgate pursues a clockwise movement, as viewed in the drawings, until it reaches a vertical or closed position, when the mentioned electric motor is stopped. In Fig. 7 the tailgate is shown in broken lines almost in its mentioned closed position. The tailgate may be latched in its said closed position by any suitable means (not shown) and also, after the tailgate is latched closed the tailgate may be raised slightly and then suitable supporting pins or brackets (not shown) may be arranged to support the said tailgate so that the cables 16 may be relieved of the weight of the tailgate in transit.

To open the tailgate, it is first unlatched from its closed position, then the mentioned electric motor is caused to raise the shoe 19, during which movement the tailgate moves counterclockwisely until the chains 55 assume the weight of the tailgate and the cables 58 become slack. Then the said electric motor is stopped and the pins 61 removed from the holes 62 after which the tailgate, remaining in its horizontal attitude, may be lowered or raised as necessary in the loading or unloading of the vehicle.

In order to make clear the operation of the disclosed apparatus, and more particularly to point out the nature of the coaction between the component parts of apparatus according to this invention, a complete loading and unloading operation will now be described.

It may first be assumed that the disclosed vehicle, empty and with empty pallets 13 disposed like a flooring within the vehicle body, and the tailgate closed, has been backed to a loading point which may be a shipping platform, or sidewalk, etc. The operator first inserts the cable pins 61 into the holes 62 of the tailgate, then elevates the shoes 19, while the tailgate 12 turns to a horizontal position, until the chains 55 assume the weight of the tailgate. Then the pins 61 are pulled out of the holes 62 and the cables 58 permitted to hang freely.

The operator then lowers the tailgate to a point at which the bottom of the stowing rack 45 is at a slightly lower lever than the pallets 13 in the vehicle body. Then two operators, one at each side of the tailgate, slide all but one of the empty pallets into the stowing rack, making slight readjustments, if desired, in the tailgate and stowing rack level as each pallet is handled. Then the tailgate is lowered until its top surface is substantially at the level of the pallet 13 remaining within the truck body and then the two operators slide that pallet onto the tailgate. At this time it is not of any particular advantage to have a skid under the pallet.

The pallet 13 on the tailgate is then loaded with a stack of goods and the cables 20 fastened to the rearward end of the pallet 13 as shown in irregular broken lines in Fig. 2. The cables 20 are then taken up by their power means, pulling the pallet 13 and its load into the vehicle toward the rear thereof with the pallet in its broken-line-indicated position supported upon rollers 14. Then the operators detach the cable from the pallet and manually push or roll the pallet and its load to the front end of the body 11 where it may be anchored against further rolling by any suitable means (not shown).

Then the tailgate is raised sufficiently to enable a second pallet 13 to be slid from the stowing rack 45 into the body 11. Then the tailgate is lowered until its top surface is substantially at the level of said second pallet and the latter is slid onto the tailgate and loaded and moved into the vehicle body substantially into abutting relation with the mentioned first pallet and likewise anchored in place. The same procedure is then followed in rendering available, loading, and moving the remaining pallets 13 into the vehicle body. In some situations, the powered cables 20 may be employed to pull the first pallet and its load entirely to the front end of the vehicle or to pull a second or other pallet with its load forwardly into abutment with a pallet already positioned in the vehicle.

After all pallets are loaded and in the vehicle, the tailgate 12 may be closed and prepared for transit in the manner already described. If the entire load to be transported requires the use of less than all the pallets 13, those not used may be carried either in the vehicle body or in the stowing rack 45 if suitably retained in the latter in the manner already described. Of course, the load should be suitably dunnaged within the body 11 to prevent material shifting of the load in transit.

At the delivery point the tailgate 12 is opened in the manner already described and a skid 27, which may be one used by the receiver of the goods in his plant, is placed upon the tailgate and secured thereto against any material backward or forward movement, by any suitable means, as, for example, by pins 63 which may extend through suitable holes provided therefor in the tailgate. The tailgate is then either raised or lowered, as necessary, to bring the upper face of the skid 27 to a level just below that of the bottom surface of the rearmost pallet 13 and, after removing any anchoring means which were employed to anchor that pallet, the cables 20 or suitable extensions provided thereon are reeved about the sheaves 24 carried upon the rear end of the tailgate 12 in the manner shown in regular broken lines in Fig. 2 and the free ends of said cables or of their extensions are then connected to the rear end of the pallet 13. Then power is applied to the cables 20 causing the latter to pull the pallet with its load from its position within the body 11 onto the skid 27 on the tailgate, after which the cables 20 or their extensions are disconnected from the rear end of the pallet.

The abutment bar 25 is then raised to its active position by suitable operation of the electric motor 38, and the latches 42 are pushed rearwardly to assume the weight of the abutment bar. Then, by reverse operation of the motor 38, the racks 33 are lowered to clear the space beneath the abutment bar, after which the free ends of the cables 20 are passed beneath the abutment bar and attached to the forward end of the pallet 13. Then power is again applied to the cables 20 which causes the pallet 13 to be forcefully pulled forwardly while the skid 27 is held against material forward movement by the pins 63 and the load unit is held against material forward movement by the abutment bar 25. This forward movement of the pallet 13 while the load unit and the skid are thus restrained has the effect of stripping the pallet 13 from beneath the load which it formerly carried and pulling said pallet into the vehicle body. As the pallets are preferably formed of thin material such as sheet metal, a load unit does not tip or become deformed or disorganized to any material extent by this stripping operation and are left intact upon the receiver's skid.

Then, the load unit on the skid 27 may be removed from the tailgate 12 by any suitable means, as for example, by a lift truck such as the receiver may employ in shifting loads in and about his premises. For this purpose, the tailgate 12 may be raised or lowered as desired to facilitate the removal of the skid 27 and its load from the tailgate by such a lift truck.

The motor 38 is then operated again to raise the racks 33 into contact with the abutment bar 25 and to lift the latter slightly to permit the latches 42 to be moved forwardly to their non-supporting positions, whereafter the said motor may be reversely operated to lower the abutment bar to its inactive position. Although the lowering of the abutment bar has just been described as following the removal of the skid and its load unit from the tailgate, nevertheless it should be understood that the described lowering of the abutment bar may take place before the load unit has been removed from the tailgate.

After removal of the first load unit and its skid from the tailgate, the latter is elevated to bring the bottom of the stowing rack 45 just below the level of the just-emptied pallet 13 in the truck and then two operators, one at each side of the tailgate, may slide the said pallet into the stowing rack. Then another skid 27 is suitably pinned to the tailgate 12 to receive a second pallet with its load unit. After being certain that the tailgate is lowered to bring the top surface of that skid just below the top surfaces of the rollers 14, the said second pallet 13, shown in part in Fig. 2, is unanchored and, in the manner already described, it, with its load, may be pulled onto the skid on the tailgate by means of the cable mechanism as already explained. The handling of this second pallet and its load and of all other pallets and their loads, in order to move them out of the vehicle and strip their related pallets therefrom, is done in the manner already described with respect to the first or rearmost pallet; and likewise, the stowing of each empty pallet, as necessary to get it out of the way of further unloading operations, is handled in the manner already described. It should be understood that instead of using a conventional skid 27, as described, to receive a load unit being unloaded onto the tailgate, an ordinary flat pallet of wood or other suitable material may be provided to receive a load unit from a floor plate.

After the vehicle is completely unloaded, the pallets 13 in the stowing rack 45 may either be secured in said rack for transportation therein or the tailgate may be elevated to a suitable level and the empty pallets slid back by the operators into abutting positions within the vehicle body. In either event, the tailgate 12 is closed in the manner already described to put the vehicle in condition for moving to its next transportation job.

From the foregoing description it should be understood that the level of the tailgate is very easily varied, simply by operating the motor which actuates the cable 16 to facilitate either the shifting of empty pallets between the truck body 11 and the stowing rack 45, or the shifting of loaded pallets 13 between their positions within the vehicle body 11 and upon the tailgate 12, or to facilitate stripping the pallets from beneath their load units.

It should be obvious that the mechanically operated abutment bar 25 provides very convenient and effective abutment means enabling a loaded pallet to be stripped from a load unit thereon in order that the pallet may remain with the vehicle of which it is a part, while the load unit remains in condition for convenient handling by the receiver's equipment.

It should be apparent, also, that the stowing rack 45, in conjunction with the elevatable tailgate 12 provides very convenient means for stowing empty pallets during the movement of other pallets in loading or unloading operations.

It is noteworthy, also, that the novel means for opening and closing the tailgate is very effective for it has been found that a tailgate as described herein may be opened and closed in less time than tailgates operated by apparatus of the character heretofore employed.

From the foregoing description of the structure and operation of a preferred embodiment of this invention it should be understood that the tailgate operating mechanism, the pallet-stowing rack, the abutment bar and its operating mechanism, and the mechanism for horizontally moving pallets into and from within the vehicle body and for stripping the pallet from beneath a load unit, all work together to very materially reduce the labor required to load and unload a vehicle, and hence involve very substantial savings in labor costs. In addition, it should be understood that with apparatus as hereinbefore described, there is no necessity for any shipper's skids to accompany a shipment, as has heretofore been done. Therefore, by the use of this invention one may avoid the necessity of keeping records of skids so shipped and of incurring reshipment costs in getting those skids back to their owners. This obviously involves further savings, most of which may be attributed to the presently disclosed invention.

It should be obvious that the present inventive concept may be employed in various ways other than those disclosed and described in the foregoing specification, and therefore the present invention is not to be limited except as indicated in the following claims.

What I claim is:

1. Load handling means comprising a vehicle body having a bottom, a tailgate connected to the rear end of said body, a plurality of substantially flat, separately and independently horizontally-movable floor elements of relatively thin material adapted to be supported by said bottom in a series extending longitudinally of said body, shifting means for horizontally moving said floor elements separately, longitudinally of said body from said tailgate onto said bottom and vice versa, an elongate abutment bar carried by said body at the latter's rear end and movable from an inactive position clear of the path of such movement of said floor elements and loads thereon to an active position wherein said bar extends horizontally transversely of and above the said path of movement of said floor elements but in the path of movement of such a load on a floor element, and mechanical means for moving said abutment bar from its said inactive to its said active position; the said shifting means being adapted to pull a said floor element from said tailgate, horizontally toward the forward end of said body while said abutment bar prevents such forward movement of a load on the latter floor element.

2. Load handling means according to claim 1, further characterized in that the said tailgate is vertically movable to enable its adjustment to different levels suitable for receiving such floor elements moving horizontally from the vehicle body, and for discharging such floor elements moving horizontally from said tailgate onto the bottom of said vehicle.

3. Load handling means according to claim 1, further characterized in that the said shifting means comprise a powered cable adapted to extend from forwardly of said abutment bar, thence underneath the latter when in its said active position and to be connected to a said floor element on said tailgate to pull said element forwardly, from beneath a load thereon, along a path extending underneath said actively-positioned abutment bar.

4. In a vehicle; abutment apparatus comprising a horizontal elongate abutment bar extending transversely of the vehicle toward the rear end thereof, opposed guideways extending substantially angularly to horizontal in vertical longitudinal planes in fixed relation to said vehicle at opposite sides thereof and coacting with opposite ends of said bar to guide the latter between a lower position and a raised position and to restrict said bar against material horizontal movement, mechanical actuating means for moving said bar between its two mentioned positions, and means, independent of said actuating means, for holding said bar in its mentioned raised position; the said actuating means comprising an elongate rack in abutment at its upper end with an undersurface of said bar and substantially restricted to movement longitudinally of itself in substantial parallelism with respect to said guideways, a power source and transmission means between the said power source and said rack for actuating the latter to raise and lower said bar, the said rack, when said holding means are effective for holding the abutment bar in its raised position, being independently movable downwardly to provide a clear area underneath substantially the entire length of said bar.

5. In a vehicle; abutment apparatus according to claim 4, further characterized in including brake means coacting continuously with said actuating means for restraining said rack and abutment bar against material downward movement.

6. A vehicle comprising a bottom, a plurality of separately-horizontally-movable floor plates carried in transit upon said bottom, a vertically movable tailgate, actuating means for moving said floor plates separately and horizontally between said tailgate and said bottom, and floor plate stowing means on the underside of said tailgate for stowing one or more floor plates while another floor plate is being so moved by said actuating means; the said stowing means being vertically movable with the tailgate to be brought to a level at which a floor plate or plates in the vehicle may be shifted horizontally into stowing relationship with said stowing means or vice versa.

7. A vehicle comprising a body, a passageway through which material may pass into and out of said body, a plurality of pallets each horizontally movable separately in opposite directions through the passageway, a vertically movable tailgate carried by the body exteriorly of the latter and adjacent said passageway, and pallet stowing means carried by said tailgate and movable vertically therewith to and from a position at which such pallets may be moved horizontally from said body through said passageway to said stowing means and vice versa, further characterized in that the said stowing means comprises plural shelves rigidly fixed to said tailgate and extending substantially parallel to the line of movement of pallets through said passageway, the said shelves having means at their outer ends for limiting outward movement of pallets on said shelves and being normally clear of obstructions at their ends nearest to the vehicle body whereby to permit free movement of pallets in either direction between the vehicle body and said shelves.

8. A vehicle according to claim 7, further characterized in that the said tailgate is angularly movable between a horizontal position for receiving pallets from the vehicle body and a position angular to horizontal, the said shelves having manually-adjustable retaining means associated therewith at their inner ends for holding pallets against dislodgement from said shelves when the latter are in the said angular position.

9. A vehicle comprising a body, an elongate and vertically extending shoe, vertically movable relatively to said body, a tailgate pivoted at its inner end to said shoe, collapsible tailgate supporting means connected to said tailgate, at a point removed from said inner end thereof, and to said shoe at a point above the point thereon at which said tailgate is pivoted thereto, and tailgate pivoting means comprising an elongated substantially non-extensible hanger connected at its upper end to said body substantially directly over the pivot connection of the tailgate to the shoe, and having means at its lower end for connection to the tailgate outwardly of said pivot connection, whereby when the said shoe is in a substantially elevated position with the tailgate held in horizontal attitude by its said collapsible supporting means, the lower end of said hanger may be connected to said tailgate, and when said shoe is thereafter lowered, the said hanger may limit the downward movement of the tailgate in its horizontal attitude and, with continued downward movement of the tailgate at its pivoted end, may angularly move said tailgate toward a vertical position.

GEORGE H. PRIDE.

REFERENCES CITED

The following references are of record in the file of this patent:

UNITED STATES PATENTS

| Number | Name | Date |
|---|---|---|
| 1,148,531 | Oldham | Aug. 3, 1915 |
| 2,045,566 | Berg | June 30, 1936 |
| 2,236,317 | Howland | Mar. 25, 1941 |